(12) United States Patent
Li

(10) Patent No.: US 7,512,565 B2
(45) Date of Patent: Mar. 31, 2009

(54) METHOD FOR IMPLEMENTING SECURE TRANSACTION FOR ELECTRONIC DEPOSIT (PURSE)

(76) Inventor: Dongsheng Li, 4/F, +26, 4th street Chuangyezhong Road, Shangdi Information Industry Base, Beijing 10008S (CN)

( * ) Notice: Subject to any disclaimer, the term of this patent is extended or adjusted under 35 U.S.C. 154(b) by 1662 days.

(21) Appl. No.: 10/082,371

(22) Filed: Feb. 25, 2002

(65) Prior Publication Data

US 2002/0138429 A1 Sep. 26, 2002

Related U.S. Application Data

(63) Continuation of application No. PCT/CN99/00124, filed on Aug. 23, 1999.

(51) Int. Cl.
*H04K 1/00* (2006.01)
*H04L 9/00* (2006.01)
(52) U.S. Cl. .............. 705/65; 705/51; 705/57; 705/59; 235/382.5
(58) Field of Classification Search .......... 705/65, 705/51, 57, 59; 235/382.5
See application file for complete search history.

(56) References Cited

U.S. PATENT DOCUMENTS 5,773,804 A 6/1998 Baik
5,798,506 A 8/1998 Thiriet
6,116,506 A * 9/2000 Matsumoto et al. ...... 235/382.5
6,253,193 B1 * 6/2001 Ginter et al. .................. 705/57

FOREIGN PATENT DOCUMENTS

| EP | 0 735 720 A2 | 10/1996 |
| EP | 0 813 173 A2 | 12/1997 |
| WO | WO 96/27155 | 9/1996 |
| WO | WO 96/30881 | 10/1996 |

* cited by examiner

*Primary Examiner*—Andrew J. Fischer
*Assistant Examiner*—Shahid Kamal
(74) *Attorney, Agent, or Firm*—Alston & Bird LLP

(57) ABSTRACT

The invention discloses a method for securing transactions for electronic deposits. In the method, a grey lock mark is merged into an electronic deposit of an IC card and becomes one of electronic deposit attribute parameters. When locking the IC card, i.e. setting a grey lock mark on the IC card, a locking card source is recorded on the IC card at the same time. When debiting, judging the locking card source and combining the debiting operation with the unlocking operation into a one step operation, i. e. after debiting successfully, unlocking is automatically done. This can solve illegal unlocking problems effectively and thoroughly, so electronic deposit consumption transactions are more secure and convenient.

12 Claims, 3 Drawing Sheets

METHOD FOR IMPLEMENTING SECURE TRANSACTION FOR ELECTRONIC DEPOSIT (PURSE)

CROSS REFERENCE TO RELATED APPLICATION

This is a continuation application of PCT/CN99/00124, filed Aug. 23, 1999, which is incorporated herein by reference in its entirety.

FIELD OF THE TECHNOLOGY

The present invention relates generally to IC cards useful for financial applications, such as electronic deposits (bankbook) or electronic purses, and more particularly to methods for secure authentication of electronic deposits (purse) for transactions before a sale.

BACKGROUND OF THE INVENTION

At present, IC card applications are gaining in popularity and scope. Because IC cards are convenient to use, easy to carry, fast to operate and reliable for security purposes, etc., they are welcomed by more and more users, especially in self-service environments.

Nevertheless, payment systems of present IC cards are primarily directed to transactions after a sale, i.e., the user pays first, and then receives the services, e.g., shopping at store. For transactions before the sale, i.e., the payer receives the services first and then pays, e.g., refueling oil with an IC card, various factors render the use of such cards unsafe from a security standpoint, especially for services provided before the sale in self-service environments.

For example, when using current IC cards to refuel, the user inserts the IC card into a designated terminal. Both the IC card and the card terminal are mutually authenticated. The user refuels oil. After refueling is ended, the card terminal deducts money from the IC card. As can be seen from this procedure, during the period from when the user begins to refuel oil until the card terminal deducts money successfully, if the IC card is extracted from the card terminal or the power supply is interrupted or the card terminal has some accident, etc., then the card terminal does not deduct money from the IC card (known as escape card). This will cause a series of problems.

In order to solve this problem, a Grey Lock concept has been introduced to IC card refueling payment systems. The term Grey Lock indicates that a specific Mark is present on the IC card to identify its application state as of the last time the card was used. If the Grey Lock Mark is clear, this means the last transaction using the card was ended under normal circumstances and the card is ready to be used again. If the Grey Lock Mark is set, this means that the last transaction was not ended under normal circumstances. For this IC card (known as a grey or Grey Card) to be used again, its Grey Lock Mark must be cleared (also referred to as unlocking grey or unlocking Grey for short). Further, if the money which should have been deducted in the last transaction has not been deducted from the card, then a Supplementary Debit must be applied to the card.

Therefore, the procedures associated with a refueling transaction using an IC card as described above are changed to the following steps. The user inserts the card into a terminal. Both the IC card and the card terminal are mutually authenticated. The card terminal judges whether the card is a grey card. If the card is not a grey card, then the grey lock is set. The user can then refuel oil. After refueling is complete, the card terminal deducts money from the IC card and the card terminal unlocks the grey lock on the IC card. At the same time, an unlocking grey transaction is added. This procedure is as follows. If the IC card is a grey card, then the card terminal searches for a corresponding grey record. The card terminal judges whether the grey record matches with the one on the IC card. If grey records are matched, then supplementary debit is done (if necessary) according to the grey record, and the card terminal unlocks the grey lock on the IC card.

In the transaction procedures described above, the supplementary debit operation and unlocking grey operation are separate. Thus there can still be hidden security problems. For example, if there is only an unlocking grey operation without a supplementary debit operation, then the cardholder makes a profit and the card distributor realizes a loss. Herein, the "transaction beneficiary" concept is introduced for further description.

According to the beneficiary concept of an unauthorized IC card operation, the transaction (or IC card operation) is divided into a positive transaction and a negative transaction. Positive transactions (or IC card operations) include those transactions (or IC card operations) which are advantageous to the cardholder and are disadvantageous to the card distributor, including unauthorized operations such as, e.g., load, changing the limit of an overdrawn account, unlocking the personal identification number (PIN), updating protected files on the IC card, and the like. Negative transactions (or IC card operations) include those transactions (or IC card operations) which are disadvantageous to the cardholder and advantageous to the card distributor, including unauthorized operations such as, e.g. consumption, and the like. In general, for positive transactions, an encryption key is kept at a card distributor computer. For negative transactions, an encryption key is kept at a card terminal, and is conventionally stored on the card terminal PSAM card.

According to the above definitions of positive transaction and negative transaction, it can be seen that a debit operation is a negative operation. An encryption key can be stored on a PSAM card. It can also be seen that an unlocking grey operation is a positive operation, such that an encryption key should be stored in the card distributor computer. Nevertheless, an unlocking grey operation, which cannot be on-line, has to occur in a normal transaction procedure, so that the following conflict can happen. If the encryption key of the unlocked grey is put on a PSAM card, then it is possible that the PSAM card will be illegally used for unlocking grey. Because the PSAM card is only an IC card, which only calculates and authenticates passively with an encryption key, there is no mechanism to limit the unlocking operation.

In current state-of-the-art procedures, the encryption key for unlocking a grey card is put in a card terminal encryption module. Alternatively, part of the encryption key for unlocking a grey card is put on the card terminal encryption module and part of it is put on the card terminal PSAM card. A program can be put on the encryption module so as to impart some autonomy thereto. The program can be used to secure control of the unlocking grey operation. For the encryption module to have secure control of the unlocking grey operation, it is necessary to lock the card before service, i.e., to set the grey lock mark of the IC card. If the card happens to escape the system during operation, the card terminal will report by network the escaped (or lost) amount of money and present balance of the card. During the next unlocking grey operation, a supplementary debit can be applied when the grey lock mark is set and the escaped amount of money and balance has been sent back by the network. After that the IC card grey lock mark can be reset.

There are also problems with this as well. For example, the IC card cannot judge whether the supplementary debit is legal. Only the card terminal and network can secure a guarantee of the supplementary debit. This is a weak point of security. In addition, as noted above, the unlocking operation is a positive transaction. The encryption key is within an application environment such as the IC card, which cannot be controlled by the card distributor.

Up till now, there is no thorough solution for this specific transaction before sale of the IC card.

SUMMARY OF THE INVENTION

It can be seen from above the analysis that the source of the problem is that debit operations and unlocking operations are mutually independent. The conventional solution is to set up certain relationships between these two operations. In contrast, the present invention combines these two operations, namely, debit and unlocking, together to form a new method for securing a transaction before a sale for an electronic deposit.

The method of the invention combines a grey lock mark into the electronic deposit (purse), and the grey lock mark becomes one of attribute parameters of the electronic deposit (purse). When the grey lock mark is set, any operation is invalid except operations related to resetting the grey lock mark.

In the invention, when the operation is IC card locking, i.e., a grey lock mark is being set, the source of the locking card is written on the IC card simultaneously. When the operation is a debit operation, the source of the locking card is judged and a debit operation and unlock grey operation are merged into a one step operation, i.e., after the debit is successfully applied, the grey lock is unlocked automatically. The source of the locking card exists in the entire transaction procedure.

According to the invention, a computer can further keep an encryption key for implementing a debit operation and a mandatory unlock operation. This allows a grey lock IC card to implement a supplementary debit operation and a mandatory unlock grey operation on an on-line card terminal. For example, suppose there is a failure in the card terminal, so that a debit cannot be made, or data cannot be sent up, or a record of this transaction has been lost. Then the grey lock mark of the card can be reset with an on-line mode by an on-line card terminal.

The IC card consumption transaction procedure of the invention is changed as follows. An user inserts a card in a terminal. Both the IC card and the card terminal are mutually authenticated. The card terminal sets a grey lock on the IC card. The transaction is completed. After the transaction is ended, the card terminal debits from an electronic deposit (purse) on the IC card and unlocks grey the IC card.

In the locking grey IC card operation above, the IC card creates an authentication code with a locking card source, and transfers the locking card source parameters to the card terminal. The card terminal creates another locking card source with the same mechanism of the IC card. The card terminal then creates another authentication code with this other locking card source, and transfers this other authentication code to the IC card. The IC card compares these two authentication codes to see whether they are identical. If the two authentication codes are identical, the IC card initiates the locking operation and returns this grey lock characteristic code, made by the locking card source and card terminal corresponding data, to the card terminal.

The operation of debiting from electronic deposit and unlocking grey lock on the IC card above includes that the card terminal makes an authentication code with a locking card source and debit parameters and sends this authentication code and corresponding parameters to the IC card. The IC card makes another authentication code with its internal locking card source, with same parameters and same mechanism, and judges whether these two authentication codes are identical. If they are identical, the card terminal debits against electronic deposit on the IC card. If this is successfully done, then the card terminal clears the grey lock mark simultaneously.

Further, the card terminal can save the grey lock record of this time. Among them, part of the grey lock record includes the authentication code needed for debiting, the amount of the escape card of this time and the grey lock characteristic code together. The card terminal can send the grey lock record of this time up to a central computer. The next time an IC card, with an incomplete transaction ending and an in-debit grey lock, is used in a card terminal with the grey lock record, the card terminal first authenticates the grey lock characteristic code to confirm that locking card source of the IC card is same as the locking card source that is used to calculate the debit authentication code of the grey lock record. After confirming the same, the debit and unlocking operation are executed.

According to the invention, the locking card source is a procedure encryption key SESPK, which correlates with at least a temporarily created pseudo random number ICC.

In the procedure encryption code, noted above, SESPK=3DES (DPK, DATA), where DPK is a consumption encryption key that is made with a discrete IC card application sequence number by a consumption main encryption key MPK of an electronic deposit. As each IC card has a different application sequence number, the DPK of each IC card is different as well. DATA is a specific parameter including said temporary pseudo random number ICC, the transaction sequence number of the electronic deposit (purse) CTC and the last two bytes of the card terminal transaction sequence number TTC. It can be seen that each transaction SESPK is different as the IC card application sequence number and DATA are different. Thus SESPK can be used as a reliable locking card source.

When locking an electronic deposit (purse), the card terminal sends the card terminal a transaction sequence number TTC to the IC card. The IC card gets its own pseudo random number ICC and the transaction sequence number of the electronic deposit (purse) CTC. An internal procedure encryption key SESPK is created and corresponding parameters that make the procedure encryption key and grey lock characteristic code of this time are recorded. The pseudo random number ICC and the transaction sequence number of the electronic deposit (purse) CTC are sent to the card terminal. The card terminal secures the authentication module or the PSAM card has a consumption main encryption key of the electronic deposit (purse) MPK, according to the IC card application sequence number, and they deduce an IC card electronic deposit (purse) DPK. Further, according to the pseudo random number ICC, the transaction sequence number of the electronic deposit (purse) CTC and the card terminal transaction sequence number TTC, a same procedure encryption key SESPK is created using the same mechanism of the IC card.

When debiting, the card terminal calculates the authentication code by using the procedure encryption key SESPK, the debit amount, the operation date and time etc., which are also sent to the IC card. In the IC card, with the same data and same algorithm another authentication code is internally calculated. If these two authentication codes are identical, then the IC card implements debiting and unlocking internally. If these two authentication codes are different, then no internal operation of debiting and unlocking are taken, an internal error counter is incremented and an error code is returned. If the internal error counter reaches a certain number, then the IC card is internally locked to prevent further actions.

The invention, which combines grey lock mark with electronic deposit to form a specific refueling electronic deposit, can include conventional functions such as read balance, load, unload, consumption/withdrawal, change limit of overdrawn account, etc., as well as the functions of refueling debit, local unlocking grey and on-line unlocking grey.

There are new refueling electronic deposit states in the invention such as pre-refueling state, grey lock state and unlocked grey lock state, as well as conventional states such as idle state, load state, consumption/withdrawal state, unload state and update state. Also, in addition to conventional commands set, the invention includes new commands such as INITIALIZE FOR REFUEL, LOCK FOR REFUEL, DEBIT FOR REFUEL, INITIALIZE FOR UNLOCK, DEBIT FOR UNLOCK and GET GREY STATUS commands. The INITIALIZE FOR REFUEL command is used for initializing refueling transaction. The LOCK FOR REFUEL command is used for locking refueling electronic deposit with grey lock. The DEBIT FOR REFUEL command is used for local refueling and unlocking grey transaction simultaneously. The INITIALIZE FOR UNLOCK command is used for initializing on-line unlocking grey transaction. The DEBIT FOR UNLOCK command is used for on-line unlocking grey and making supplementary debit of refueling transaction simultaneously. The GET GREY STATUS command is used for reading grey lock state and launching local unlocking grey transaction.

By using the invention technical scheme, problems in the past are thoroughly solved.

As both the unlocking grey operation and the debit operation are combined into one operation, hidden troubles of grey lock management during normal unlocking operation no longer exist and they can be put on PSAM according to the negative transaction principle. When on-line unlocking, the encryption key is put in the computer according to the positive transaction principle, and its hidden trouble of management also no longer exists.

As both the unlocking grey operation and the debit operation are combined into one operation, on the one hand, illegal unlocking grey problems are transformed to correctness problem of card terminal debiting, i.e., once card terminal debiting is legal, then unlocking is also legal. On the other hand, when a supplementary debit happens after a card escapes, because only the IC card and the PSAM of the card terminal, where the card has escaped, know the procedure encryption key SESPK used for this supplementary debit, and the card terminal PSAM does not keep SESPK after the transaction is ended, during supplementary debit only the IC card knows (internally recovering) this encryption key. During the supplementary debit, the debiting authentication key is the one calculated by the card terminal PSAM before SESPK is deleted, and any illegal updating the SESPK or its calculating parameters (such as amount of escape card etc.) will cause failure of supplementary debit, and at the same time internal application locking mechanism of IC card can prevent misuse. Therefore it is transformed to IC card security mechanism problem with no relationship with the application.

In summary, the unlocking grey problem is transformed to a reliability problem of the card terminal and the IC card.

These can be controlled effectively, and there are no conflicts with present security mechanisms of card terminals and IC cards.

EMBODIMENTS OF THE INVENTION

Figure 1:
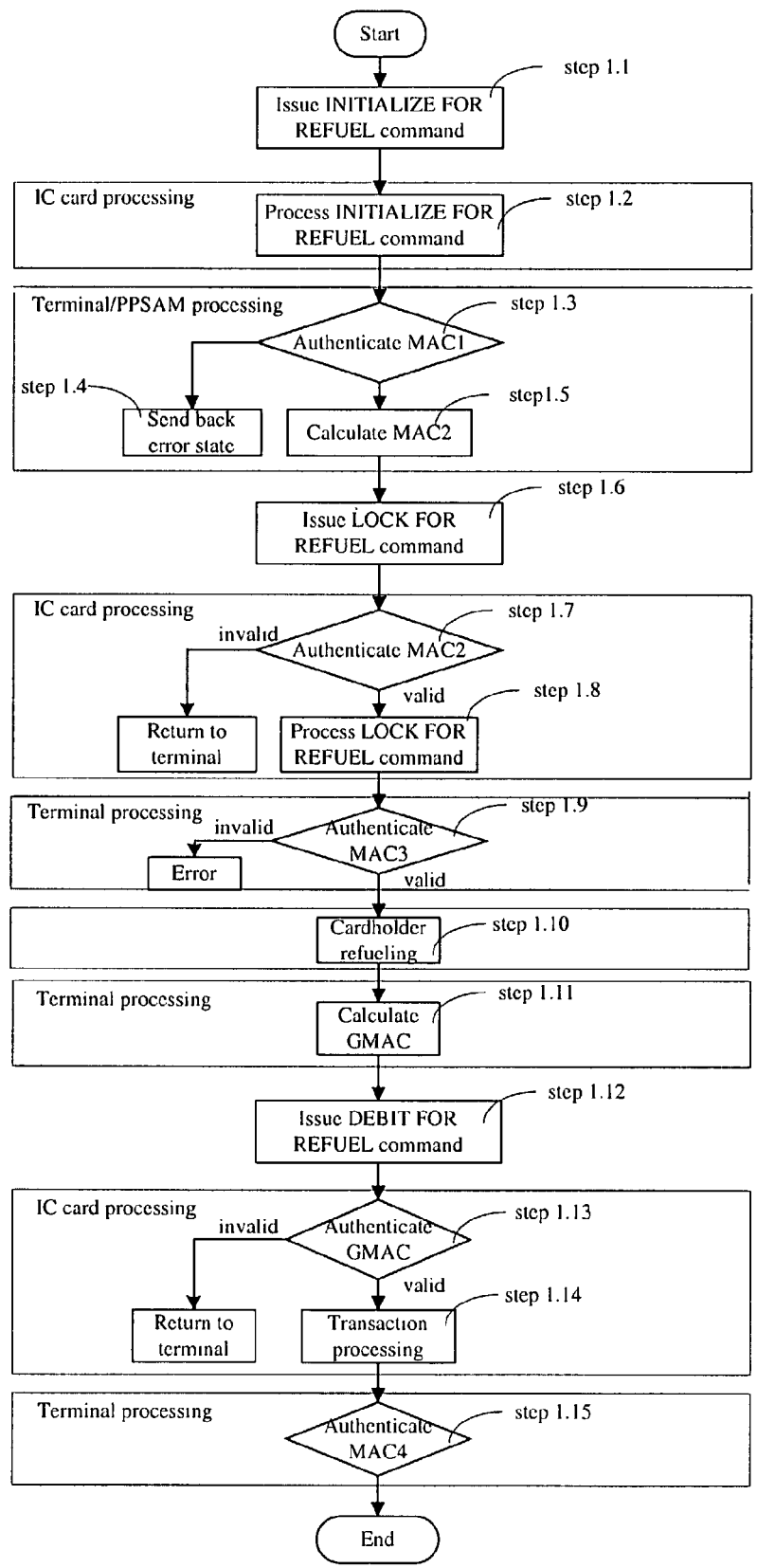
FIG. 1 is a refueling transaction procedure for electronic deposit in accordance with an embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Using a payment system for refueling oil as an example, the present invention combines electronic deposit with grey lock to form a special electronic deposit known as a refueling electronic deposit. The refueling electronic deposit has a refueling debit function, a local unlocking grey function and an on-line unlocking grey function, as well as general electronic deposit functions, such as read balance, load, unload, consumption/withdrawal and change limit of overdrawn account etc. Refueling debit, local unlocking grey and on-line unlocking grey are new functions, and are described in detail in the following.

During use a card is in one state, and in specific states, only some commands can be executed. The card has the following states: idle, load, consumption/withdrawal, unload, update, pre-refueling, grey lock and unlock grey. Among these pre-refueling, grey lock and unlock grey are specific states for refueling electronic deposit.

When an usage of an IC card has been selected, first the card enters idle state. After receiving a command from a card terminal, the card must check whether the command is allowed for the present state. If the command is executed successfully, then the card enters another state (or the same state) as shown in table 1. If the command is not executed successfully, then the card enters idle state.

Table 1 shows the state changes after successful execution. The first row includes the states present when the command is issuing, the first column includes the commands to be issued and the whole table shows the states after a command is successfully executed.

The shaded part of table 1 shows a state where a command to the card is not available (N/A). This means that the card does not execute the command and gives as the response a "6901" state, i.e., don't accept command state (N/A), to the card terminal. As the command cannot be executed, if the card is originally at the grey lock state, then the result is the card remains at the grey lock state. If the card is originally at any of the other states, then the result is the card is at the idle state.

TABLE 1

State changes after command is successfully executed.

| Command State | Idle | Load | C/W | Unload | Update | PR | Lock | Unlock |
|---|---|---|---|---|---|---|---|---|
| Load | N/A | idle | N/A | N/A | N/A | N/A | N/A | N/A |
| Consumption/withdrawal | N/A | N/A | Idle | N/A | N/A | N/A | N/A | N/A |
| Unload | N/A | N/A | N/A | idle | N/A | N/A | N/A | N/A |
| Read balance | idle | load | C/W | unload | Update | RC | lock | unlock |
| Transaction authentication | idle | load | C/W | unload | Update | RC | lock | unlock |
| Load initialization. | load | load | Load | load | Load | load | N/A | N/A |
| Consumption initialization | C/W | C/W | C/W | C/W | C/W | C/W | N/A | N/A |
| Withdrawal initialization | C/W | C/W | C/W | C/W | C/W | C/W | N/A | N/A |
| Unload initialization. | unload | unload | Unload | unload | Unload | unload | N/A | N/A |
| Update initialization. | update | update | Update | update | Update | update | N/A | N/A |
| Change limit of overdraw | N/A | N/A | N/A | N/A | Idle | N/A | N/A | N/A |
| INITIALIZE FOR REFUEL. | PR | PR | PR | PR | PR | PR | N/A | N/A |
| Refueling & locking | N/A | N/A | N/A | N/A | N/A | lock | N/A | N/A |
| Refueling consumption | N/A | N/A | N/A | N/A | N/A | N/A | idle | N/A |
| INITIALIZE FOR UNLOCK. | N/A | N/A | N/A | N/A | N/A | N/A | unlock | unlock |
| Unlocking | N/A | N/A | N/A | N/A | N/A | N/A | N/A | idle |
| GET GREY STATUS | N/A | N/A | N/A | N/A | N/A | N/A | lock | N/A |

In table 1 above, C/W represents Consumption/Withdrawal, PR represents Pre-refueling, RC represents Refueling consumption, lock represents locking grey, and unlock represents unlocking grey.

Table 2 defines command type, code of command byte and parameters P1 and P2 used for refueling electronic deposit. In the command set, in addition to the general commands of electronic deposit, some specific commands are added: INITIALIZE FOR REFUEL, LOCK FOR REFUEL, refuel, INITIALIZE FOR UNLOCK, unlocking grey and GET GREY STATUS. The INITIALIZE FOR REFUEL command is used for initializing refueling debit transaction. The LOCK FOR REFUEL command is used for locking grey refueling electronic deposit. The refuel command is used for local refueling oil transaction and unlocking grey simultaneously. The unlocking Initialization command is used for initializing on-line unlocking grey transaction. The unlocking grey command is used for on-line unlocking grey transaction and supplementary debit simultaneity. The GET GREY STATUS command is used to read grey lock state.

TABLE 2

Command type byte and instruction bytes

| Command | CLA | INS | P1 | P2 |
|---|---|---|---|---|
| Update PIN | 80 | 5E | 01 | 00 |
| Load | 80 | 52 | 00 | 00 |
| Consumption/withdrawal | 80 | 54 | 01 | 00 |
| Unload | 80 | 54 | 03 | 00 |
| Read balance | 80 | 5C | 00 | 0X |
| Transaction authentication | 80 | 5A | 00 | XX |
| Withdrawal initialization | 80 | 50 | 02 | 01 |
| Load initialization | 80 | 50 | 00 | 0X |
| Consumption initialization | 80 | 50 | 01 | 0X |
| Unload initialization | 80 | 50 | 05 | 01 |
| Change overdrawn limit initialization | 80 | 50 | 04 | 01 |
| Reload PIN | 80 | 5E | 00 | 00 |
| Change overdrawn limit | 80 | 58 | 00 | 00 |
| * INITIALIZE FOR REFUEL | E0 | 50 | 01 | 01 |
| * Refueling and locking | E0 | 50 | 02 | 01 |
| * Refueling consumption | E0 | 54 | 01 | 00 |
| * INITIALIZE FOR UNLOCK | E0 | 50 | 03 | 01 |
| * Unlocking | E0 | 54 | 01 | 01 |
| * GET GREY STATUS | E0 | 50 | 04 | 01 |

In the following, each of the new commands is described in detail.

1. INITIALIZE FOR REFUEL command:

The INITIALIZE FOR REFUEL command is used for initializing a refueling debit transaction. Its command message is shown in table 3, the data field of the command message is shown in table 4, and the response message data field of successful execution is shown in table 5. If the command is unsuccessfully executed, then only the response message SW1 and SW2 is sent back. If the command is successfully executed, the state code of the response message is "9000". Table 6 lists the possible en-or states, sent by the IC card, where ED is refueling electronic deposit.

TABLE 3

INITIALIZE FOR REFUEL command message

| Code | Value |
|---|---|
| CLA | E0 |
| INS | 50 |
| P1 | 01 |

TABLE 3-continued

INITIALIZE FOR REFUEL command message

| Code | Value |
|---|---|
| P2 | 01 used for refueling, others reserved |
| $L_c$ | 0B |
| Data | See table 4 |
| $L_e$ | 10 |

TABLE 4

INITIALIZE FOR REFUEL command message data field

| Description | Length (bytes) |
|---|---|
| Encryption key index | 1 |
| Terminal number | 6 |
| Terminal transaction sequence number | 4 |

TABLE 5

INITIALIZE FOR REFUEL response message data field

| Description | Length (bytes) |
|---|---|
| ED balance | 4 |
| ED off-line transaction sequence number | 2 |
| Encryption key version | 1 |
| Algorithm identifier | 1 |
| Pseudo random number (ICC) | 1 |
| MAC1 | 4 |

TABLE 6

INITIALIZE FOR REFUEL error states

| SW1 | SW2 | Description |
|---|---|---|
| 69 | 01 | Command unaccepted (invalid state i.e. grey lock source has been created) |
| 65 | 81 | Memory error |
| 69 | 85 | Use condition unsatisfied |
| 94 | 03 | Encryption key index unsupported |
| 94 | 02 | Transaction counter at maximum |

2. LOCK FOR REFUEL command:

The LOCK FOR REFUEL command is used for locking grey refueling electronic deposit. Its command message is shown in table 7, the data field of the command message is shown in table 8, and the response message data field of successful execution is shown in table 9. If the command is unsuccessfully executed, then only the response message SW1 and SW2 is sent back. If the command is successfully executed, the state code of the response message is "9000". Table 10 lists the possible error states sent by the IC card.

TABLE 7

LOCK FOR REFUEL command message

| Code | Value |
|---|---|
| CLA | E0 |
| INS | 50 |
| P1 | 02 |
| P2 | 01 |
| $L_c$ | 0B |

TABLE 7-continued

LOCK FOR REFUEL command message

| Code | Value |
|---|---|
| Data | See table 8 |
| $L_e$ | 08 |

TABLE 8

LOCK FOR REFUEL command message data field

| Description | Length (bytes) |
|---|---|
| Transaction date (terminal) | 4 |
| Transaction time (terminal) | 3 |
| MAC2 | 4 |

TABLE 9

LOCK FOR REFUEL response message data field

| Description | Length (bytes) |
|---|---|
| TAC | 4 |
| MAC3 | 4 |

TABLE 10

LOCK FOR REFUEL error states

| SW1 | SW2 | Description |
|---|---|---|
| 69 | 01 | Command unaccepted (invalid state) |
| 65 | 81 | Memory error |
| 69 | 85 | Use condition unsatisfied |
| 93 | 02 | MAC invalid |

3. DEBIT FOR REFUEL command:

The DEBIT FOR REFUEL command is used for a local refueling oil debit transaction and unlocking grey simultaneously. Its command message is shown in table 11, the data field of the command message is shown in table 12, and the response message data field of successful execution is shown in table 13. If the command is unsuccessfully executed, then only the response message SW1 and SW2 is sent. If the command is successfully executed, the state code of response message is "9000". Table 14 lists the possible error states sent by the IC card.

TABLE 11

DEBIT FOR REFUEL command message

| Code | Value |
|---|---|
| CLA | E0 |
| INS | 54 |
| P1 | 01 |
| P2 | 00 |
| $L_c$ | 19 |
| Data | See table 12 |
| $L_e$ | 08 |

TABLE 12

DEBIT FOR REFUEL command message data field

| Description | Length (bytes) |
|---|---|
| Transaction amount | 4 |
| ED off-line transaction sequence number | 2 |
| Terminal number | 6 |
| Terminal transaction sequence number | 4 |
| Transaction date (terminal) | 4 |
| Transaction time (terminal) | 3 |
| GMAC | 4 |

TABLE 13

DEBIT FOR REFUEL response message data field

| Description | Length (bytes) |
|---|---|
| TAC | 4 |
| MAC4 | 4 |

TABLE 14

DEBIT FOR REFUEL error states

| SW1 | SW2 | Description |
|---|---|---|
| 69 | 01 | Command unaccepted (invalid state) |
| 65 | 81 | Memory error |
| 69 | 85 | Use condition unsatisfied |
| 67 | 00 | Length error |
| 93 | 02 | MAC invalid |

4. INITIALIZE FOR UNLOCK command:

The INITIALIZE FOR UNLOCK command is used for initializing on-line unlocking grey transactions. Its command message is shown in table 15, the data field of the command message is shown in table 16, and the response message data field of successful execution is shown in table 17. If the command is unsuccessfully executed, then only the response message SW1 and SW2 is sent back. If the command is successfully executed, the state code of the response message is "9000". Table 18 lists the possible error states sent by the IC card.

TABLE 15

INITIALIZE FOR UNLOCK command message

| Code | Value |
|---|---|
| CLA | E0 |
| INS | 50 |
| P1 | 03 |
| P2 | 01 for refueling transaction, others reserved |
| $L_c$ | 07 |
| Data | See table 16 |
| $L_e$ | 10 |

TABLE 16

INITIALIZE FOR UNLOCK command message data field

| Description | Length (bytes) |
|---|---|
| Encryption key index | 1 |
| Terminal number | 6 |

TABLE 17

INITIALIZE FOR UNLOCK response message data field

| Description | Length (bytes) |
|---|---|
| ED balance | 4 |
| ED off-line transaction sequence number | 2 |
| Encryption key version | 1 |
| Algorithm identifier | 1 |
| Pseudo random number (ICC) | 4 |
| MAC1 | 4 |

TABLE 18

INITIALIZE FOR UNLOCK error states

| SW1 | SW2 | Description |
|---|---|---|
| 69 | 01 | Command unaccepted (invalid state i.e. grey lock has not been created) |
| 65 | 81 | Memory error |
| 69 | 85 | Use condition unsatisfied |
| 94 | 03 | Encryption key index unsupported |
| 94 | 02 | Transaction counter at maximum |

5. DEBIT FOR UNLOCK command:

The DEBIT FOR UNLOCK command is used for on-line unlocking grey transaction and supplementary debit simultaneously. Its command message is shown in table 19, the data field of the command message is shown in table 20, and the response message data field of successful execution is shown in table 21. If the command is unsuccessfully executed, then only the response message SW1 and SW2 is sent back. If the command is successfully executed, the state code of the response message is "9000". Table 22 lists the possible error states sent by the IC card.

TABLE 19

DEBIT FOR UNLOCK command message

| Code | Value |
|---|---|
| CLA | E0 |
| INS | 54 |
| P1 | 01 |
| P2 | 01 |
| $L_c$ | 0F |
| Data | See table 20 |
| $L_e$ | 04 |

TABLE 20

DEBIT FOR UNLOCK command message data field

| Description | Length (bytes) |
|---|---|
| Transaction amount | 4 |
| Transaction date (computer) | 4 |
| Transaction time (computer) | 3 |
| MAC2 | 4 |

TABLE 21

DEBIT FOR UNLOCK response message data field

| Description | Length (bytes) |
|---|---|
| MAC3 | 4 |

TABLE 22

DEBIT FOR UNLOCK error states

| SW1 | SW2 | Description |
|---|---|---|
| 69 | 01 | Command unaccepted (invalid state) |
| 65 | 81 | Memory error |
| 69 | 85 | Use condition unsatisfied |
| 67 | 00 | Length error |
| 93 | 02 | MAC invalid |

6. GREY STATUS command:

The GREY STATUS command is used to get grey lock state. Its command message is shown in table 23, there is no data field of the command message, and the response message data field of successful execution is shown in table 24. If the command is unsuccessfully executed, then only the response message SW1 and SW2 is sent back. If the command is successfully executed, the state code of the response message is "9000". Table 25 lists the possible error states sent by the IC card.

TABLE 23

GET GREY STATUS command message

| Code | Value |
|---|---|
| CLA | E0 |
| INS | 50 |
| P1 | 04 |
| P2 | 01 |
| $L_c$ | Non-existence |
| Data | Non-existence |
| $L_e$ | 11 |

TABLE 24

GET GREY STATUS response message data field

| Description | Length (bytes) |
|---|---|
| Grey flag | 1 |
| ED balance | 4 |
| ED off-line transaction sequence number | 2 |
| ED on-line transaction sequence number | 2 |
| MAC3 | 4 |
| TAC | 4 |

MAC3 and TAC are return value from IC card when grey lock.

TABLE 25

GET GREY STATUS error states

| SW1 | SW2 | Description |
|---|---|---|
| 69 | 01 | Command unaccepted (invalid state) |
| 65 | 81 | Memory error |
| 69 | 85 | Use condition unsatisfied |
| 67 | 00 | Length error |

The transaction procedures of the extended applications of refueling, local unlocking grey and on-line unlocking grey are described in detail.

1. Refueling transaction:

This procedure allows a cardholder to use refueling electronic deposit to refuel at an IC card refueling machine. The transaction can be an off-line transaction. The refueling transaction asks for a personal identification number (PIN). The procedure is also illustrated in FIG. 1, as follows:

step 1.1: card terminal issues an INITIALIZE FOR REFUEL command to start refueling transaction.

Step 1.2: after receiving INITIALIZE FOR REFUEL command, the IC card deals with the command, including:

(1) check whether the IC card is in a grey lock state, if it is, return state code "6901" (unsupported encryption key index) without other data;

(2) check whether encryption key index included in the command is supported by the IC card, if it is not supported, return state code "9403" (unsupported encryption key index) without other data;

(3) after passing above checks, the IC card will makes a pseudo random number ICC, a procedure encryption key SESPK and a message authentication code MAC1. The SESPK is used for refueling transaction of refueling electronic deposit. The SESPK is formed by SESPK=3DES (DPK, DATA), where DPK is the consumption encryption key of refueling electronic deposit, DATA includes: a pseudo random number ICC, an off-line transaction sequence number CTC of refueling electronic deposit, the last two bytes of card terminal transaction sequence number TTC and 3DES is triple length of DES algorithm.

SESPK works with the following data in sequence to calculate MAC1:

balance of refueling electronic deposit;

transaction type identifier ("10" for refueling transaction);

card terminal number (the card terminal which issues LOCK FOR REFUEL command).

Step 1.3: authenticating MAC1.

With the pseudo random number ICC and off-line transaction sequence number of refueling electronic deposit returned by the IC card, the refueling security authentication module PSAM makes a procedure encryption key SESPK and authenticates MAC1; if MAC1 is valid, then next step is step 1.5, otherwise step 1.4.

Step 1.4: send back error state, card terminal should stop refueling.

Step 1.5: calculating MAC2.

After the card terminal validates that the refueling transaction can proceed, a message authentication code MAC2 is created for the IC card to validate PSAM.

SESPK works with the following data in sequence to calculate MAC2:

transaction type identifier ("10" for refueling transaction);

card terminal number (the card terminal which issues LOCK FOR REFUEL command);

transaction date (the card terminal which issues LOCK FOR REFUEL command);

transaction time (the card terminal which issues LOCK FOR REFUEL command).

Step 1.6: card terminal issues LOCK FOR REFUEL command.

Step 1.7: authenticating MAC2.

After receiving a LOCK FOR REFUEL command, the IC card will authenticate MAC2; if it is valid, then the next step is step 1.8, otherwise returns error state "9302" (MAC is invalid) to the card terminal.

Step 1.8: LOCK FOR REFUEL command processing.

IC card writes the pseudo random number ICC, card terminal number, card terminal transaction sequence number, transaction date and transaction time to an internal file, in order to recover IC card data if power supply is interrupted during refueling; sets refueling electronic deposit in grey lock state; except DEBIT FOR REFUEL and DEBIT FOR UNLOCK commands, inhibits IC card operations (such as load, unload, consumption/withdrawal, and change limit of overdrawn account etc.), which will change balance of refueling electronic deposit. When card terminal issues these inhibited commands, an error state "6989" (card has been locked) will be returned to the card terminal.

The off-line transaction sequence number of refueling electronic deposit is incremented by the IC card.

The IC card makes a message authentication code MAC3 for PSAM to check whether the IC card is legal, and writes MAC3 into an internal file at the same time. MAC3 is included in the response message of the LOCK FOR REFUEL command and the response message of the GET GREY STATUS command, which are transferred from the IC card to the PSAM (through the card terminal). SESPK works with the following data to calculate MAC3:

balance of refueling electronic deposit;
off-line transaction sequence number (before incremented) of refueling electronic deposit;
transaction type identifier ("10" for refueling transaction);
card terminal number (the card terminal which issues LOCK FOR REFUEL command);
transaction date (the card terminal which issues LOCK FOR REFUEL command);
transaction time (the card terminal which issues LOCK FOR REFUEL command).

With the same mechanism, the IC card makes a transaction signature TAC by using the transaction authentication encryption key DTK directly, and writes TAC into an internal file at the same time. TAC is included in the response message of the LOCK FOR REFUEL command and the response message of the GET GREY STATUS command, which are transferred from the IC card to the PSAM (through the card terminal). If an exception happens such as an escape card, it is impossible for the transaction to go on. Then TAC will be written into the card terminal transaction itemized list in order to transfer to the computer the transaction authentication for the locked grey card. The following are the main elements to make TAC:

balance of refueling electronic deposit;
off-line transaction sequence number (before incremented) of refueling electronic deposit;
transaction type identifier;
card terminal number;
transaction date (card terminal);
transaction time (card terminal).

Step 1.9 Authenticating MAC3.

The card terminal authenticates the validation of MAC 3. If it is valid, then transaction processing goes to step 1.10, otherwise the card terminal will make an exception processing.

Step 1.10 Cardholder refueling.

During refueling, the IC card is allowed to power-off. After power-off, the IC card can be inserted again. After transaction makes preprocessing (authenticating encryption code, selecting application), step 1.11 can be executed continually.

Step 1.11 Making GMAC.

The refueling consumption secure authentication module PSAM makes a message authentication code GMAC with the procedure encryption key SESPK for the IC card to authenticate whether the PSAM is legal.

SESPK works with the following datum to calculate GMAC:

refueling transaction amount.

Step 1.12 Card terminal issues a DEBIT FOR REFUEL command.

Step 1.13 Authenticating GMAC.

After receiving the DEBIT FOR REFUEL command, the IC card first authenticates whether the proposed off-line transaction sequence number of the IC card is matched. If it is unmatched, then an error returns without affecting the error counter.

Secondly, the IC card authenticates whether the GMAC is valid. If it is valid, then transaction processing executes step 1.14 continually. If it is invalid, then an error statement "9302" (MAC invalid) is returned to the card terminal and the error counter in the IC card is decreased at the same time. When the error counter is zero, the IC card is locked permanently in order to prevent misuse.

Step 1.14 Transaction processing.

The IC card subtracts the refueling transaction amount from the refueling electronic deposit balance and recovers the refueling electronic deposit state from the grey lock state to the normal state. The IC card must perform all of the steps above completely or without performing any step. If the balance update or refueling electronic deposit recovery state are unsuccessful, then the transaction itemized list should not be revised also.

The IC card creates a message authentication code MAC4 for the PSAM to check whether the IC card is legal. The MAC4 is included in the response message of the REFUEL command sent from the IC card to the PSAM (through the card terminal). DPK works in the data as shown below, as calculation inputs, for calculating MAC4:

amount of refueling transaction;
transaction type identifier;
card terminal number;
transaction date (computer);
transaction time (computer).

With the same mechanism, the IC card also makes a transaction signature TAC by using the transaction authentication encryption key DTK directly. TAC will be written into the transaction itemized list of the card terminal to be transferred to the computer later for transaction authentication. The following are the main elements for making TAC:

transaction amount;
transaction type identifier;
card terminal number (the card terminal which issues DEBIT FOR REFUEL command);
card terminal transaction sequence number (the card terminal which issues DEBIT FOR REFUEL command);
transaction date (the card terminal which issues DEBIT FOR REFUEL command);
transaction time (the card terminal which issues DEBIT FOR REFUEL command).

The IC card will use the following data to form a record for updating the transaction itemized list.

off-line transaction sequence number of refueling electronic deposit;
transaction amount;
transaction type identifier;
card terminal number (the card terminal which issues DEBIT FOR REFUEL command);
transaction date (the card terminal which issues DEBIT FOR REFUEL command);
transaction time (the card terminal which issues DEBIT FOR REFUEL command).

Step 1.15 Authenticating MAC4.

After receiving MAC4 from the IC card (through the card terminal), PSAM authenticates MAC4 validation, and the result is transferred to the card terminal to allow necessary measures to be taken.

2. On-line unlocking grey transaction

Figure 2:
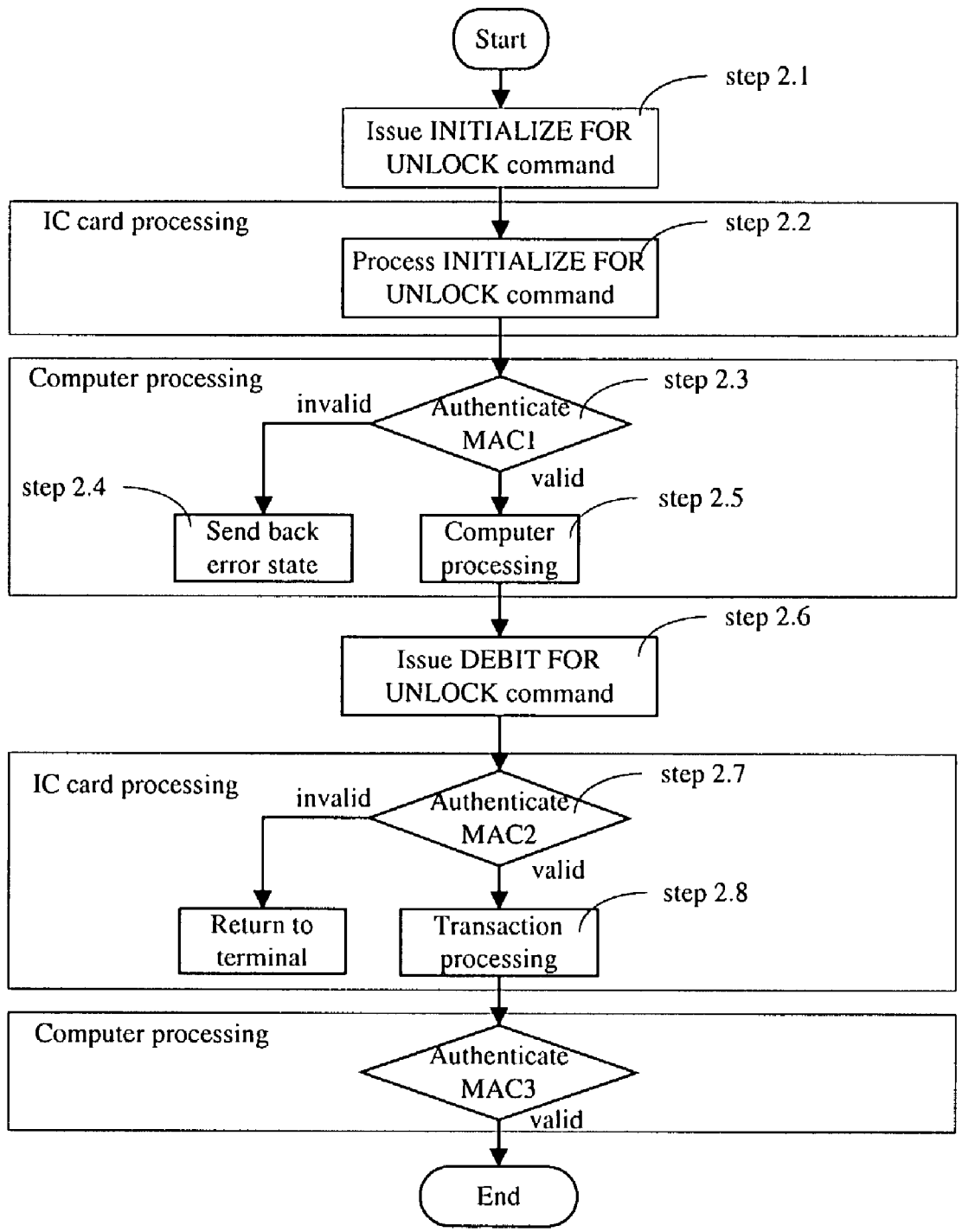
FIG. 2 is an on-line unlocking grey transaction procedure for electronic deposit in accordance with an embodiment of the invention.

The on-line unlocking grey transaction allows a cardholder to unlock a grey lock card (recovering to normal state) and supplementary debit simultaneously. This transaction must be made on an on-line card terminal and the cardholder must propose a PIN. Reference to FIG. 2.

In Step 2.1 the card terminal issues an INITIALIZE FOR UNLOCK command to start refueling transaction.

In Step 2.2 after the IC card has received the INITIALIZE FOR UNLOCK command, it deals with this command, including the steps:

(1) check whether the IC card is at grey lock state, if it is not, then returns state code "6901" (illegal command) without any other data;

(2) check whether the encryption key index included in the command is supported by IC card, if it is not supported, then returns state code "9403" (unsupported encryption key index) without any other data;

(3) after passing above checks, the IC card will make a pseudo random number ICC, a procedure encryption key SESULKK and a message authentication code MAC1 for the computer to check whether the unlocking grey transaction and the IC card are legal. The procedure encryption key SESULKK is made by unlocking grey encryption key DULKK with the same mechanism of making consumption encryption key and used for unlocking grey transaction. Inputting data for making procedure encryption key SESULKK are as following:

SESULKK: pseudo random number ICC ∥ transaction sequence number of refueling electronic deposit ∥ "8000".

SESULKK works with the following data in sequence to calculate MAC1:

balance of refueling electronic deposit;
transaction type identifier ("11" for unlocking grey transaction);
card terminal number.

The IC card sends the response message of the INITIALIZE FOR UNLOCK command to the card terminal for processing. If the returning state is not "9000", then the card terminal will stop the transaction.

After receiving the response message of the INITIALIZE FOR UNLOCK command, the card terminal sends an allowance request message, including data shown in table 17, of unlocking grey to the card distributor computer.

Step 2.3 Authenticating MAC1

The Computer makes SESULKK and checks whether MAC1 is valid, if it is valid, then executes step 2.5, otherwise executes step 2.4.

Step 2.4 returning error state

When there are conditions that cannot be accepted by the unlocking grey transaction, the computer will inform the card terminal and the card terminal should take necessary measures to deal with the same.

Step 2.5 Computer processing

After confirming that the load transaction can be made, the computer makes a message authentication code MAC2 for checking whether the computer is legal by the IC card. SESULKK works with the following data in sequence to calculate MAC2:

supplementary debit amount of transaction;
transaction type identifier;
card terminal number;
transaction date (computer);
transaction time (computer).

The computer sends an unlocking transaction accepted message to the card terminal, including MAC2, transaction date (computer) and transaction time (computer).

In Step 2.6 when the card terminal has received the unlocking transaction accepted message from the computer, the card terminal will send a DEBIT FOR UNLOCK command to the IC card to update the balance of the refueling electronic deposit and to return the refueling electronic deposit to its normal state.

Step 2.7 authenticating MAC2

After receiving the DEBIT FOR UNLOCK command, the IC card authenticates whether MAC2 is valid. If it is valid, the transaction executes step 2.8 continually, otherwise an error statement "9302" (MAC invalid) is sent back to the card terminal.

Step 2.8 transaction processing

The IC card subtracts the supplementary debit amount of the transaction from the balance of the refueling electronic deposit on the card, increments the on-line transaction sequence number of the refueling electronic deposit, and recovers the refueling electronic deposit state from grey lock to normal. The IC card must perform all of the steps above completely or without performing any one step. If the balance or the sequence number or the refueling electronic deposit state are updated unsuccessfully, then the transaction itemized list also should not be updated. The IC card makes a message authentication code MAC3 for checking whether the IC card is legal by the computer. MAC3 is included in the response message of the DEBIT FOR UNLOCK command transferred from the card to the computer (through the card terminal). SESULKK works with the following data to calculate MAC3:

balance of refueling electronic deposit;
on-line transaction sequence number of refueling electronic deposit (before increment);
supplementary debit amount;
transaction type identifier;
card terminal number;
transaction date (computer);
transaction time (computer).

The IC card also makes a transaction signature TAC by using the transaction authentication encryption key DTK directly with the same mechanism. TAC will be written into the card terminal transaction itemized list for transferring to a computer later to authenticate the transaction. The following are the main elements for making TAC:

balance of refueling electronic deposit;
on-line transaction sequence number of refueling electronic deposit (before increment);
supplementary debit amount;
transaction type identifier;
card terminal number;
transaction date (computer);
transaction time (computer).

The IC card uses the following data to form a record for updating the transaction itemized list:

on-line transaction sequence number of refueling electronic deposit;
supplementary debit amount;
transaction type identifier;
card terminal number;
transaction date (computer);
transaction time (computer).

Step 2.9 authenticating MAC3

When MAC3 from the IC card (through the card terminal) has been received, validation of MAC3 should be authenticated. If it is valid, then step 2.10 will be executed, otherwise the computer will send an error message to the card terminal.

Step 2.10 returning acknowledgement

When step 2.9 has been successfully completed, the computer takes corresponding processing.

3. Local unlocking grey transaction

Figure 3:
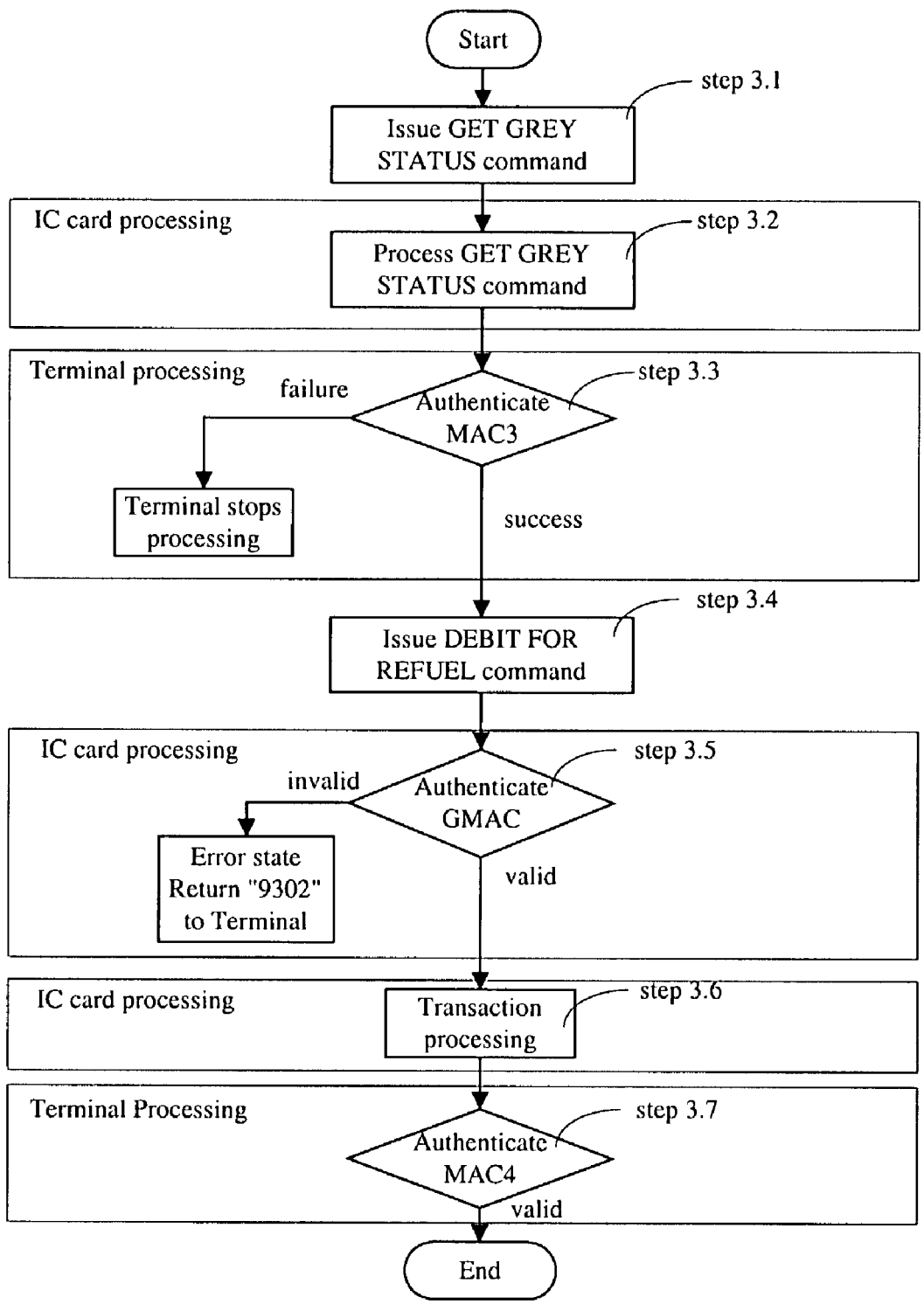
FIG. 3 is a local unlocking grey transaction procedure for electronic deposit in accordance with an embodiment of the invention.

The local unlocking grey transaction allows the cardholder to make a supplementary debit and to unlock grey (recovering to normal state). This transaction must be done on the card terminal that has the escape card record of the last time. The cardholder must propose a PIN to perform the unlock grey transaction. Reference to FIG. 3.

In Step 3.1 the card terminal issues a GET GREY STATUS command to launch the local unlock grey transaction.

In Step 3.2 when the IC card has received the GET GREY STATUS command, the IC card sends grey mark state (Grey flag) of the electronic deposit, the balance of the electronic deposit, the on-line transaction sequence number of the electronic deposit, the off-line transaction sequence number of the electronic deposit, MAC3 and TAC when locking to the card terminal through the GET GREY STATUS command response message.

Step 3.3 authenticating MAC3

When the card terminal has confirmed that the electronic deposit of the IC card is in a grey lock state, it will compare the MAC3 received with the MAC3 on the escape card record.

Step 3.4 card terminal issues a DEBIT FOR REFUEL command.

Step 3.5 authenticating GMAC

After receiving the DEBIT FOR REFUEL command, the IC card authenticates whether the off-line transaction sequence number of the IC card CTC submitted by the card terminal is matched. If it is unmatched, returns directly without affecting error counter.

The IC card should authenticate validation of GMAC. If it is valid, transaction processing will continue to step 3.6, otherwise an error statement "9302" (MAC is invalid) will be sent back to the card terminal. At the same time, the IC card internal error counter decrements. If the error counter is zero, the IC card is locked permanently in order to prevent misuse.

SESPK works with the following datum to calculate GMAC:

refueling transaction amount.

Step 3.6 transaction processing

The IC card subtracts the refueling transaction amount from the refueling electronic deposit balance on the card, and recovers from the grey lock state to the normal state. The IC card must perform all of these steps above completely or without performing any one step. If the balance or the refueling electronic deposit state are updated unsuccessfully, then the transaction itemized list also should not be updated.

The IC card makes a message authentication code MAC4 for PSAM to check whether the IC card is legal. MAC4 is included in the response message of the DEBIT FOR REFUEL command sent from the card to PSAM (through the card terminal) as an input for MAC4 calculation. DPK works on the following datum to calculate MAC4:

refueling transaction amount.

The IC card also makes a transaction signature TAC by using the transaction authentication encryption key DTK directly with the same mechanism. TAC will be written into the card terminal transaction itemized list for transferring to a computer later to authenticate the transaction. The following are the main elements for making TAC:

transaction amount;
transaction type identifier;
card terminal number (the card terminal which issues DEBIT FOR REFUEL command);
card terminal transaction sequence number (the card terminal which issues DEBIT FOR REFUEL command);
transaction date (the card terminal which issues DEBIT FOR REFUEL command);
transaction time (the card terminal which issues DEBIT FOR REFUEL command).

The IC card uses the following data to form a record for updating the transaction itemized list:

off-line transaction sequence number of refueling electronic deposit;
transaction amount;
transaction type identifier;
card terminal number (the card terminal which issues DEBIT FOR REFUEL command);
transaction date (the card terminal which issues DEBIT FOR REFUEL command);
transaction time (the card terminal which issues DEBIT FOR REFUEL command).

Step 3.7 authenticating MAC4

After receiving MAC4 from the IC card (through the card terminal), PSAM would authenticate MAC4 validation. The result of authentication is sent to the card terminal for taking any necessary measures.

In the application of refueling electronic deposit, metadata definition includes:

1. transaction type identifier:
10—refueling
11—unlock grey
12—local unlock grey
other transaction type identifiers are same as state-of-the-art.

2. encryption key relationship:
special encryption keys used for refueling electronic deposit are all double length DEA encryption key (128 bits).

| Encryption key | Card distributor bank | IC card | POS. (PSAM) |
|---|---|---|---|
| Encryption key used for unlocking transaction | Unlock grey encryption main key (MULKK) | Unlock encryption sub-key (DULKK) | N/A |

Other encryption key relationship refers to state-of-the-art definition.

IC card internal changes includes:

1. Each refueling electronic deposit has a corresponding internal file used for storing a pseudo random number ICC, a card terminal number, a card terminal transaction sequence number, a transaction date, a transaction time and MAC2 at grey lock state. The internal file is kept when the power supply of the IC card is interrupted for recovery.

2. Operating refueling electronic deposit

When the IC card has received a command for refueling electronic deposit, internal operations needed are:

check whether the refueling electronic deposit is at grey lock state, if it is not, enter idle state;
if it is at grey lock state, from internal file the IC card recovers pseudo random number ICC, card terminal number, card terminal transaction sequence number, transaction date, transaction time and MAC2 at last locking; and recovers procedure encryption key SESPK with the same mechanism of recovering data.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for securing transactions using electronic deposits (purses), comprising:
    configuring, in an electronic deposit (purse), a grey lock mark being an attribute parameter of the electronic deposit (purse), which identifies the state of the last transaction of the electronic deposit (purse) as being one of complete and incomplete, the grey lock mark being configured to have one of a clear status when the last transaction was completed and a set (grey) status when the last transaction was incomplete, wherein after setting the grey lock mark, all operations to the electronic deposit (purse) except resetting the grey lock mark being invalidated;
    setting, while staffing a transaction using the electronic deposit (purse), the grey lock mark and recording parameters of the transaction as a locking card source in the electronic deposit (purse); and
    validating the recorded locking card source before debiting money from the electronic deposit (purse), and if the recorded parameters are validated, debiting money from the electronic deposit (purse) and resetting the grey lock mark simultaneously.

2. The method according to claim 1, further comprising:
    storing an encryption key in a host computer of the distributor who distributes the electronic deposit (purse), in order to debit supplementary money from the electronic deposit (purse) and to reset the grey lock mark compulsorily in the electronic deposit (purse), which is being set the grey lock mark, on an on-line card terminal by an on-line mode.

3. The method according to claim 1, wherein the procedure of securing transactions using electronic deposits (purse) comprises:
    inserting the electronic deposit (purse) into a transaction terminal;
    authenticating mutually by the electronic deposit (purse) and the terminal;
    setting the grey mark in the electronic deposit (purse) by the terminal;
    performing a consumption; and
    after the consumption is complete, debiting appropriate money from the electronic deposit (purse) resetting the grey mark simultaneously by the terminal.

4. The method according to claim 3, wherein the step of setting the grey lock mark comprises:
    generating a first locking code by the electronic deposit (purse) according to the locking card source and transmitting simultaneously the locking card source to the transaction terminal using the electronic deposit (purse);
    generating a second locking card code by the terminal in the same way as the electronic deposit (purse) and generating a first authentication code according to the second locking code and sending the first authentication code to the electronic deposit (purse);
    generating a second authentication code by the electronic deposit (purse) according to the first locking code in the same was as the terminal;
    determining whether the received first authentication code and the generated second authentication code are identical, and if yes, setting the grey lock mark; and
    wherein the step of debiting money from the electronic deposit (purse) and resetting the grey lock mark simultaneously, comprises:
    generating a third authentication code according to the second lock code and parameters for debiting money from the electronic deposit (purse) by the terminal, and sending the generated third authentication code and the parameters to the electronic deposit (purse);
    generating a fourth authentication code according to the first lock code and the received parameters by the electronic deposit (purse); and
    determining whether the received third authentication code and the generated fourth authentication code are identical, and if yes, debiting money from the electronic deposit (purse) and resetting the grey lock mark simultaneously after debiting successfully.

5. The method according to claim 4, wherein the step of validating the recorded locking card source comprises:
    generating a fifth authentication code according to the first locking code by the electronic deposit (purse) and sending the fifth authentication code to the terminal;
    generating a sixth authentication code according to the second locking code by the terminal and determining whether the received fifth authentication code and the generated sixth authentication code are identical, if yes, it means that the recorded locking card source is validated, otherwise, the recorded locking card source is invalidated; and
    if the transaction using the electronic deposits (purses) is incomplete, the method further comprising:
    storing the sixth authentication code and parameters for debiting money from the electronic deposits (purses) together as part of a grey record information by the terminal, and sending the grey record information to the host computer of the distributor who distributes the electronic deposit (purse); and
    if the electronic deposit (purse) is used in any terminal that stores the grey record information, before validating the recorded locking card source, the method further comprising:
    regenerating the fifth authentication code according to the recorded locking card source by the electronic deposit (purse) and send the fifth authentication code to the terminal.

6. The method according to claim 1, wherein the step of generating a first locking code according to the locking card source comprises:
    generating a procedure encryption key (SESPK), correlating to at least a pseudo random number (ICC) created temporarily, in the electronic deposit (purse).

7. The method according to claim 6, wherein the equation of generating a procedure encryption key (SESPK) comprises:
    the procedure encryption key (SESPK)=3DES (DPK, DATA), where DPK is a consumption encryption key of the electronic deposit (purse); and DATA is a specific parameter including a pseudo random number (ICC) temporarily created by the electronic deposit (purse), a transaction sequence number of the electronic deposit (purse) (CTC), and the last two bytes of the terminal transaction sequence number (TTC).

8. The method according to claim 6, wherein the step of setting the grey lock mark comprises: locking grey the IC card comprises:
- sending a terminal transaction sequence number (TTC) to the electronic deposit (purse) by the terminal;
- getting a pseudo random number (ICC) and an electronic deposit (purse) transaction sequence number (CTC) by the electronic deposit (purse);
- generating a first procedure encryption key (SESPK) and recording the parameters of this generating step and also generating and recording a sixth authentication code of this time;
- sending the pseudo random number (ICC) and the electronic deposit (purse) transaction sequence number (CTC) from the electronic deposit (purse) to the terminal, which has stored a consumption main encryption key (MPK) in its security authentication module (PSAM);
- deriving the electronic deposit (purse) DPK by the security authentication module (PSAM); and
- generating a second procedure encryption key (SESPK) by the terminal using the pseudo random number (ICC), the electronic deposit (purse) transaction sequence number (CTC), and the terminal transaction sequence number (TTC) in the same way as the electronic deposit (purse); and wherein the step of debiting money from the electronic deposit (purse) and resetting the grey lock mark simultaneously comprises:
- generating the third authentication code by the terminal according to the second procedure encryption key (SESPK), and at least the debit amount, operation date and time, and sending the third authentication code, the second procedure encryption key (SESPK), and at least the debit amount, operation date and time to the electronic deposit (purse);
- generating the fourth authentication code by the electronic deposit (purse) according to the first procedure encryption key (SESPK), using the same data and algorithm as the terminal;
- determining by the electronic deposit (purse) whether the third authentication code and the fourth authentication code are identical, and if yes, debiting money and resetting the grey lock mark, and otherwise, incrementing an internal error counter and returning an error code without debiting money from the electronic deposit (purse) and resetting the grey lock mark simultaneously; and
- locking the electronic deposit (purse) internally to prevent misuse, when the internal error counter reaches a predetermined number.

9. The method according to claim 1, wherein the step of setting a grey lock mark comprises creating a refueling electronic deposit.

10. The method according to claim 9, wherein said refueling electronic deposit includes the functions of refueling transaction, local transaction for resetting the grey lock mark and on-line transaction for resetting the grey lock mark.

11. The method according to claim 9, wherein said refueling electronic deposit further includes the states of pre-refueling, grey lock and unlocked grey.

12. The method according to claim 9, wherein said refueling electronic deposit further comprises the commands of INITIALIZE FOR REFUEL, LOCK FOR REFUEL, DEBIT FOR REFUEL, INITIALIZE FOR UNLOCK, DEBIT FOR UNLOCK and GET GREY STATUS, wherein the INITIALIZE FOR REFUEL command is used for refueling consumption transaction initialization, the LOCK FOR REFUEL command is used for making grey lock to refueling electronic deposit (purse), the DEBIT FOR REFUEL command is used for local refueling consumption and unlocking grey simultaneously, the INITIALIZE FOR UNLOCK command is used for on-line unlocking and consumption transaction initialization, the DEBIT FOR UNLOCK command is used for on-line unlocking grey transaction and supplementary debiting refueling consumption simultaneously, and the GET GREY STATUS command is used for reading grey lock state and launching local unlocking grey transaction.

* * * * *

UNITED STATES PATENT AND TRADEMARK OFFICE
CERTIFICATE OF CORRECTION

PATENT NO. : 7,512,565 B2 Page 1 of 1
APPLICATION NO. : 10/082371
DATED : March 31, 2009
INVENTOR(S) : Li It is certified that error appears in the above-identified patent and that said Letters Patent is hereby corrected as shown below:

Column 2,
Line 31, "arc" should read --are--.

Column 8,
Line 57, "en-or" should read --error--.

Column 13,
Lines 13 and 14, "GREY STATUS" should read --GET GREY STATUS--.

Column 21,
Line 26, "staffing" should read --starting--.

Signed and Sealed this

Eighth Day of September, 2009

David J. Kappos
*Director of the United States Patent and Trademark Office*